(12) United States Patent
Davlos et al.

(10) Patent No.: US 10,127,314 B2
(45) Date of Patent: Nov. 13, 2018

(54) SYSTEMS AND METHODS FOR OPTIMIZING SEARCH ENGINE PERFORMANCE

(75) Inventors: Efstratios Davlos, Cupertino, CA (US);
Ethan R. Deyoung, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/426,150

(22) Filed: Mar. 21, 2012

(65) Prior Publication Data

US 2013/0254177 A1 Sep. 26, 2013

(51) Int. Cl.
*G06F 7/00* (2006.01)
*G06F 17/30* (2006.01)

(52) U.S. Cl.
CPC .............................. *G06F 17/30864* (2013.01)

(58) Field of Classification Search
CPC ......... G06F 17/30864; G06F 17/30867; G06F 17/30648; G06F 17/30675; G06F 17/30929
See application file for complete search history.

(56) References Cited

U.S. PATENT DOCUMENTS

| | | | |
|---|---|---|---|
| 5,864,845 A * | 1/1999 | Voorhees et al. | |
| 7,406,462 B2 * | 7/2008 | Carmel ............. | G06F 17/30864 707/706 |
| 7,617,193 B2 | 11/2009 | Bitan et al. | |
| 7,630,978 B2 | 12/2009 | Li et al. | |
| 8,346,791 B1 * | 1/2013 | Shukla .............. | G06F 17/30864 707/759 |
| 2002/0165925 A1 * | 11/2002 | Hamilton, II ..... | G06F 17/30902 709/213 |
| 2006/0206454 A1 * | 9/2006 | Forstall ............. | G06F 17/30864 |
| 2006/0277190 A1 * | 12/2006 | Fox ................... | G06F 17/30595 |

(Continued)

FOREIGN PATENT DOCUMENTS

EP 1826943 A1 * 8/2007
WO WO-2005024661 3/2005

(Continued)

OTHER PUBLICATIONS

"Multimedia Retrieval" edited by H. Henk M. Blanken, Henk Ernst Blok, Arjen P. de Vries, Ling Feng. Publisher Springer. pp. 353-356, Published 2007. Please also see Books by Google at http://books.google.com/.*

*Primary Examiner* — Hasanul Mobin
(74) *Attorney, Agent, or Firm* — Womble Bond Dickinson (US) LLP

(57) ABSTRACT

Systems and methods are provided for receiving from a user a seed string including one or more letters, generating search queries based on the seed string, and executing a search associated with each of the search queries where each search query includes at least one of an example, suggestion, and term. The systems and methods also include generating a set of search results associated with each of the search queries, determining a search query evaluation value for each of the search queries based at least in part on comparing the set of search results associated with each of the search queries with an expected set of search results, determining a relevancy value for each of the search queries, and configuring a search criteria of the search engine based on the determined relevancy values.

25 Claims, 11 Drawing Sheets

(56) References Cited

U.S. PATENT DOCUMENTS

| | | | |
|---|---|---|---|
| 2007/0255702 A1 | 11/2007 | Orme | |
| 2008/0016034 A1* | 1/2008 | Guha | G06F 17/30864 |
| 2008/0195601 A1 | 8/2008 | Ntoulas et al. | |
| 2008/0256023 A1* | 10/2008 | Nair | G06F 17/3064 |
| 2009/0222445 A1* | 9/2009 | Tavor | G06F 17/2217 |
| 2009/0240674 A1 | 9/2009 | Wilde et al. | |
| 2009/0282025 A1* | 11/2009 | Winter | G06F 17/30256 |
| 2010/0250524 A1 | 9/2010 | Hu et al. | |
| 2010/0299343 A1* | 11/2010 | Ahari | G06F 17/30702 |
| | | | 707/759 |
| 2010/0306590 A1* | 12/2010 | Anand | G06F 11/3664 |
| | | | 714/32 |
| 2011/0082859 A1* | 4/2011 | Deng | G06F 17/30451 |
| | | | 707/728 |
| 2011/0099163 A1* | 4/2011 | Harris | G06F 17/30997 |
| | | | 707/723 |
| 2011/0202543 A1* | 8/2011 | Chin | G06F 17/30247 |
| | | | 707/749 |
| 2011/0238656 A1* | 9/2011 | Hood | G06F 17/30864 |
| | | | 707/722 |
| 2012/0016857 A1 | 1/2012 | Gross et al. | |
| 2013/0080460 A1 | 3/2013 | Tomko et al. | |
| 2015/0161255 A1* | 6/2015 | Battle | G06F 17/30864 |
| | | | 707/706 |

FOREIGN PATENT DOCUMENTS

| | | |
|---|---|---|
| WO | WO 2010/038923 A1 | 4/2010 |
| WO | WO 2012/052983 A1 | 4/2012 |

* cited by examiner

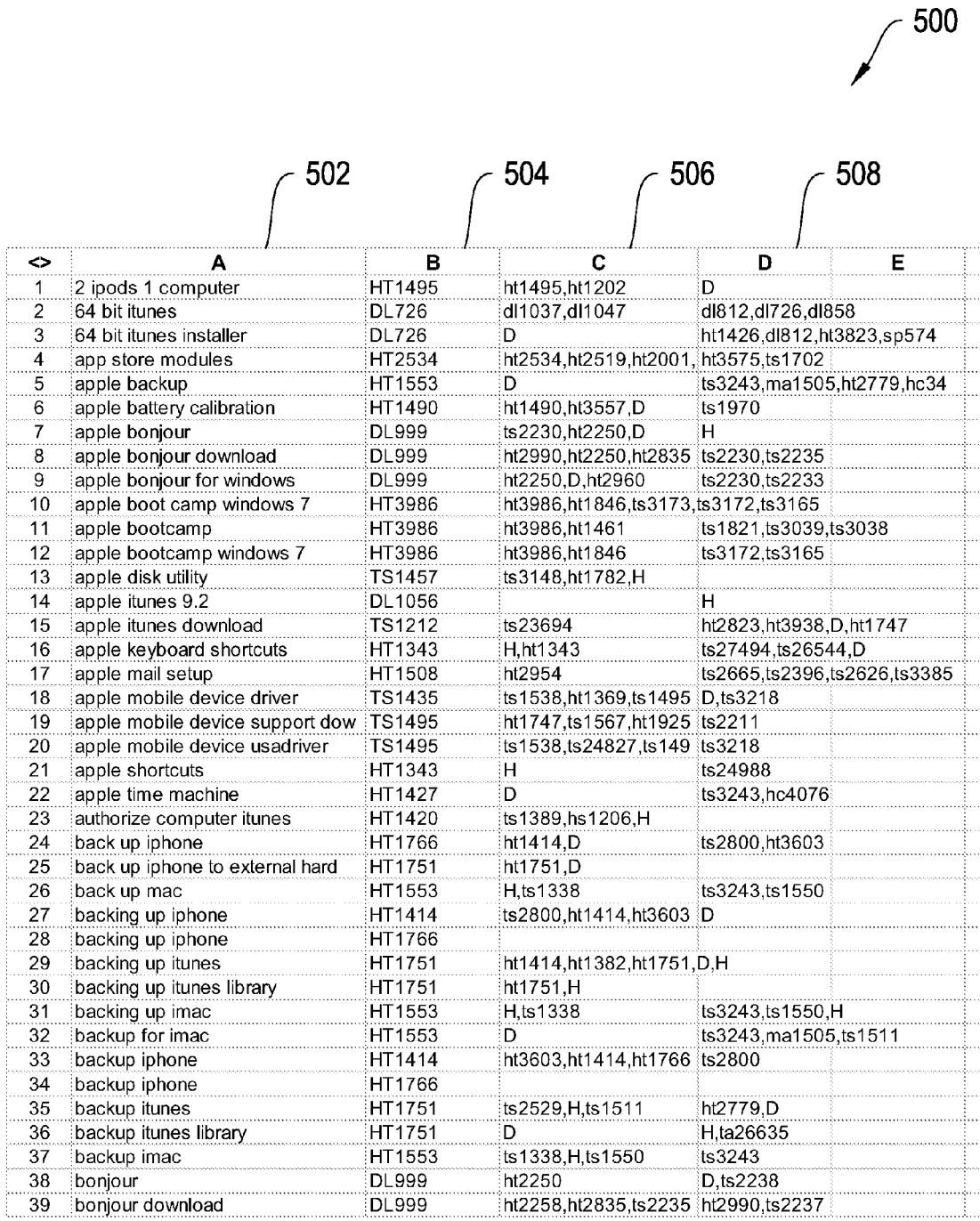

| | A | B | C | D | E |
|---|---|---|---|---|---|
| 1 | 2 ipods 1 computer | HT1495 | ht1495,ht1202 | D | |
| 2 | 64 bit itunes | DL726 | dl1037,dl1047 | dl812,dl726,dl858 | |
| 3 | 64 bit itunes installer | DL726 | D | ht1426,dl812,ht3823,sp574 | |
| 4 | app store modules | HT2534 | ht2534,ht2519,ht2001, | ht3575,ts1702 | |
| 5 | apple backup | HT1553 | D | ts3243,ma1505,ht2779,hc34 | |
| 6 | apple battery calibration | HT1490 | ht1490,ht3557,D | ts1970 | |
| 7 | apple bonjour | DL999 | ts2230,ht2250,D | H | |
| 8 | apple bonjour download | DL999 | ht2990,ht2250,ht2835 | ts2230,ts2235 | |
| 9 | apple bonjour for windows | DL999 | ht2250,D,ht2960 | ts2230,ts2233 | |
| 10 | apple boot camp windows 7 | HT3986 | ht3986,ht1846,ts3173,ts3172,ts3165 | | |
| 11 | apple bootcamp | HT3986 | ht3986,ht1461 | ts1821,ts3039,ts3038 | |
| 12 | apple bootcamp windows 7 | HT3986 | ht3986,ht1846 | ts3172,ts3165 | |
| 13 | apple disk utility | TS1457 | ts3148,ht1782,H | | |
| 14 | apple itunes 9.2 | DL1056 | | H | |
| 15 | apple itunes download | TS1212 | ts23694 | ht2823,ht3938,D,ht1747 | |
| 16 | apple keyboard shortcuts | HT1343 | H,ht1343 | ts27494,ts26544,D | |
| 17 | apple mail setup | HT1508 | ht2954 | ts2665,ts2396,ts2626,ts3385 | |
| 18 | apple mobile device driver | TS1435 | ts1538,ht1369,ts1495 | D,ts3218 | |
| 19 | apple mobile device support dow | TS1495 | ht1747,ts1567,ht1925 | ts2211 | |
| 20 | apple mobile device usadriver | TS1495 | ts1538,ts24827,ts149 | ts3218 | |
| 21 | apple shortcuts | HT1343 | H | ts24988 | |
| 22 | apple time machine | HT1427 | D | ts3243,hc4076 | |
| 23 | authorize computer itunes | HT1420 | ts1389,hs1206,H | | |
| 24 | back up iphone | HT1766 | ht1414,D | ts2800,ht3603 | |
| 25 | back up iphone to external hard | HT1751 | ht1751,D | | |
| 26 | back up mac | HT1553 | H,ts1338 | ts3243,ts1550 | |
| 27 | backing up iphone | HT1414 | ts2800,ht1414,ht3603 | D | |
| 28 | backing up iphone | HT1766 | | | |
| 29 | backing up itunes | HT1751 | ht1414,ht1382,ht1751,D,H | | |
| 30 | backing up itunes library | HT1751 | ht1751,H | | |
| 31 | backing up imac | HT1553 | H,ts1338 | ts3243,ts1550,H | |
| 32 | backup for imac | HT1553 | D | ts3243,ma1505,ts1511 | |
| 33 | backup iphone | HT1414 | ht3603,ht1414,ht1766 | ts2800 | |
| 34 | backup iphone | HT1766 | | | |
| 35 | backup itunes | HT1751 | ts2529,H,ts1511 | ht2779,D | |
| 36 | backup itunes library | HT1751 | D | H,ta26635 | |
| 37 | backup imac | HT1553 | ts1338,H,ts1550 | ts3243 | |
| 38 | bonjour | DL999 | ht2250 | D,ts2238 | |
| 39 | bonjour download | DL999 | ht2258,ht2835,ts2235 | ht2990,ts2237 | |

FIG. 5

```
RTS - Test #4 -- home sharing itunes
Looking for BEST ARTICLE: [HT3819], and GOOD ARTICLE(s):[ts2972, SP574, SP573]
-----------
Results:
-----------
#1...   HT3819
***Expected Result, found in position: 1
#2...   HT4363
#3...   TS3536
#4...   HT4352
#5...   TS3509
#6...   TS2972
***Good result, found in position: 6
***Ignoring Good Result because it was not in the top: 5
#7...   HT4557
#8...   TS1408
#9...   HT1947
10...  HT1727 best found: 1 (out of 1)
good found: 0 (out of 3)
bad found: 0
precision: .025
recall:    0.25
Relevency: 0.25
-----------------------------------------------> [Executed in :2596(ms)]
```

FIG. 7

```
Queries: 5
Total Best matches: 4
Total Good Matches: 0
Total Bad Matches: 0
Total number of queries with zero (0) best+good articles found: 1
TOTAL (avg) Precision: 0.65   ← 802
TOTAL (avg) Recall: 0.65      ← 804
TOTAL (avg) Relevancy: 0.65   ← 806
```

SYSTEMS AND METHODS FOR OPTIMIZING SEARCH ENGINE PERFORMANCE

FIELD

This application relates to searching data and, more particularly, to generating search results.

BACKGROUND

Search engines are typically designed to search for information stored in a database in response to a user query for particular information. A web search engine searches for information on the World Wide Web (WWW) and FTP servers. Search results are typically presented as a list of results on one or more search engine results pages.

Web search engines typically perform functions such as web crawling, data indexing, and information searching. Web search engines gather information about web pages using a web crawler or spider and store the information in a database. The data in the database is typically indexed based on certain information such as titles, headings, metadata, and other fields. Indexing enables a search engine to efficiently find queried information.

When a user enters a query into a search engine, the search engine typically analyzes its index and, in response, provides a listing of web pages based on certain search criteria defined by the search engine. The resulting list of web pages may or may not be sufficiently relevant to the query entered by the user. Thus, there is a need to ensure that sufficiently relevant search results are provided in response to user queries.

SUMMARY

The application, in various implementations, provides systems, methods and devices that provide techniques for optimizing search engine performance.

In one aspect, the systems, methods, and devices include a computer and a computer readable medium, operatively coupled to the computer. The computer readable medium stores program codes causing the computer to perform functions including receiving from a user a seed string including one or more letters and generating at least one search query based on the seed string. The search query may include at least one of an example, suggestion, and term. An example, suggestion, and/or term may include a word, name, portion of a word, and/or identifier of a topic or subject of interest.

The computer may send, to the search engine, the at least one search query for execution of a search associated with each of the at least one search query. The computer may then receive, from the search engine, a set of search results associated with each of the at least one search query. The computer may determine a search query evaluation value for each of the at least one search query based at least in part on comparing the set of search results associated with each of the at least one search query with an expected set of search results.

The computer may then determine a relevancy value for each of the at least one search query, where each relevancy value is based on the search evaluation values associated with the at least one search query. Then, the computer may configure the search criteria of the search engine based on one or more of the determined relevancy values.

In one configuration, the computer determines at least one search evaluation value subsequent to the search. In another configuration, the computer determines the least one search evaluation value in real-time during the search. The search query evaluation value may include a precision value and/or a recall value. The computer may weight the precision value and/or the recall value.

In some implementations, the computer determines a mean relevancy value based on multiple relevancy values, where each relevancy value is calculated based on different weighting of the precision value and/or the recall value. The computer may generate the at least one search query based on an assigned query value. The computer may determine the relevancy value for each of the at least one search query based on a domain associated with a searcher using the seed string.

In some configurations, the computer receives the expected set of search results from a data store. In one configuration, configuring the search criteria includes updating a dictionary associated with the search engine. The computer may repeat one or more steps and/or functions until the relevancy value associated with at least one search query is greater than or equal to a relevancy threshold value.

In another aspect, a system for optimizing search engine performance includes a search query generator. The search query generator is arranged to receive from a user a seed string including one or more letters and generate at least one search query based on the seed string. The search query may include an example, suggestion, and/or term. The search query generator is also arranged to send, to the search engine, the at least one search query for execution of a search associated with each of the at least one search query.

The system also includes an evaluator arranged to receive, from the search engine, a set of search results associated with each of the at least one search query. The evaluator is also arranged to determine a search query evaluation value for each of the at least one search query based at least in part on comparing the set of search results associated with each of the at least one search query with an expected set of search results. The evaluator may then determine a relevancy value for each of the at least one search query, where each relevancy value is based on the search evaluation values associated with the at least one search query. The evaluator may then configure the search criteria of the search engine based on one or more of the determined relevancy values.

The search query generator and evaluator may reside in the same location. The search query generator may be located remotely from the evaluator. At least one of the search query generator and evaluator may reside in the same location as the search engine. The search query evaluation value may include a precision value and/or a recall value.

Various advantages and applications for using a name pronunciation system and interface in accordance with principles of the present disclosure are discussed in more detail below.

BRIEF DESCRIPTION OF THE DRAWINGS

The above and other features of the present application, its nature and various advantages will become more apparent upon consideration of the following detailed description, taken in conjunction with the accompanying drawings, in which like reference characters refer to like parts throughout, and in which:

FIG. 5 is a display of data within a data file including a list of search queries and corresponding lists of best search results, good search results, and bad search results respectively;

FIG. 7 is a display of the results of performance evaluation associated with another search query;

FIG. 8 is a display showing the determination of average precision, recall, and relevancy for a set of search queries;

DETAILED DESCRIPTION OF THE DISCLOSURE

Figure 1:
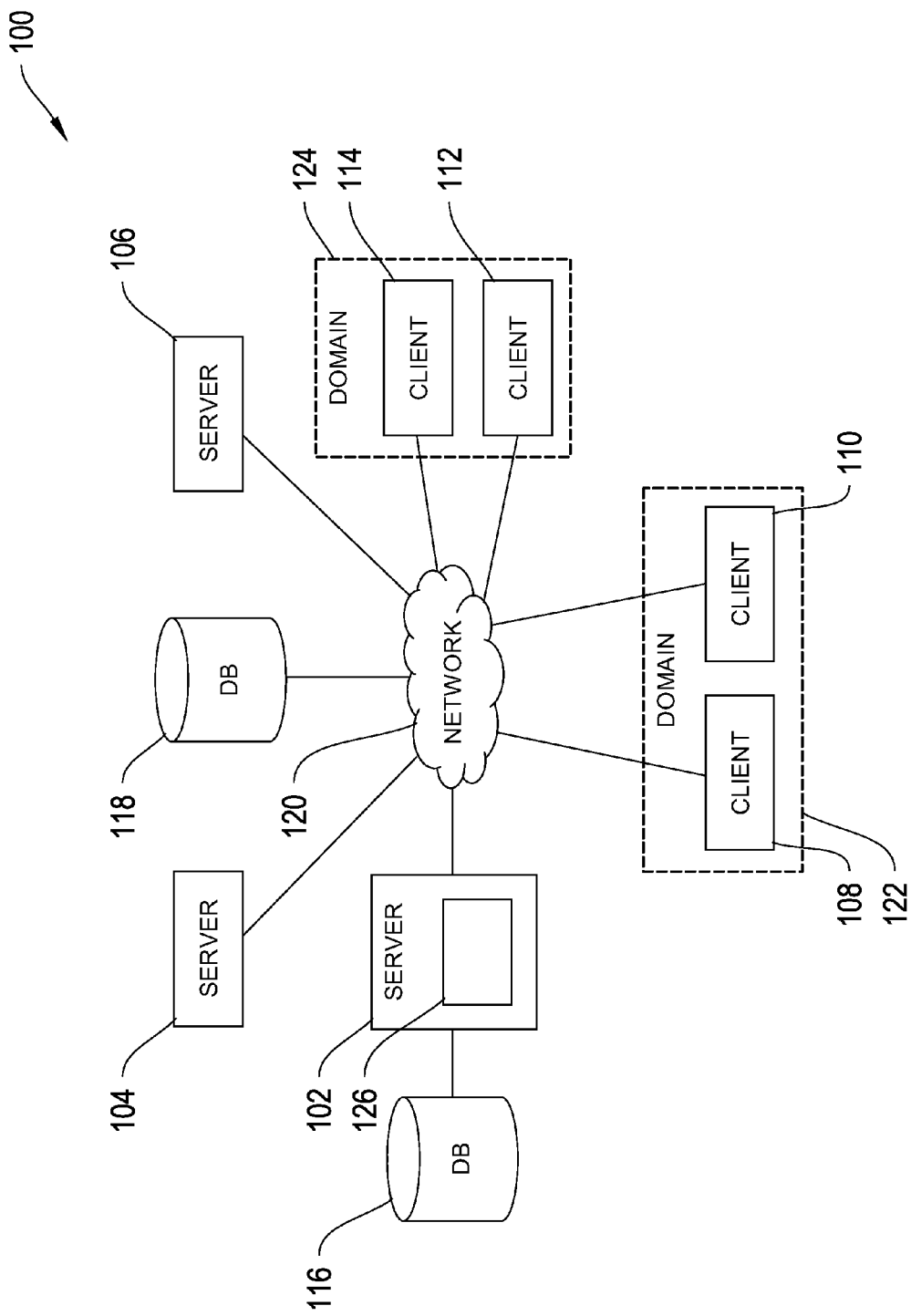
FIG. 1 is a diagram of a system that enables an optimization of search engine performance.

FIG. 1 is a diagram of a system 100 that enables an optimization of search engine performance. The system includes servers 102, 104, and 106, clients 108, 110, 112, and 114, databases 116 and 118, and network 120. The clients 108 and 110 may be associated with a first domain 122 while the clients 112 and 114 may be associated with a second domain 124.

In one configurations, server 106 includes a search engine application that accesses indexed information stored in database 118. The search engine application in server 106 may include a web server and be accessible by any one of the clients 108-114 using, for example, a web browser. The search engine application may include an Internet-based search engine such as, without limitation, Google®, Bing®, and Yahoo!®.

In certain implementations, server 104 includes a user application such as, for example, an online support application, a customer relationship management (CRM) application, a help desk application, a supply management application, a human resources support application, an business enterprise application, and so on. The user application in server 104 may include a web server and be accessible by any one of the clients 108-114 using, for example, a web browser.

In certain implementations, server 102 includes a query value application and/or search query generator 126. The server 102 may include a search engine performance evaluator 128. Further details regarding the operation of the search query generator 126 and/or evaluator 128 are discussed later herein with respect to FIGS. 3-11. The server 102 may interface with a local database and/or cache 116. The cache 116 may store a portion of the information stored in the database 118 to enable more efficient access to selected information from the cache 116 instead of the database 118. The server 102 may store information including one or files with search query data, search results data, performance analysis data, and the like.

The network 120 may include any suitable circuitry, device, system, or combination of these (e.g., a wireless communications infrastructure including communications towers and telecommunications servers) operative to create a communications network. Network 120 may be capable of providing communications using any suitable communications protocol. Network 120, servers 102-106, and/or clients 108-114 may support, for example, traditional telephone lines, cable television, Wi-Fi™, Ethernet, Bluetooth™, high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), any other communications protocols, or any combination thereof.

In certain implementations, servers 102, 104, and/or 106 include one or more of a LINUX, UNIX, Windows®, or MAC OS operating system. Severs 102, 104, and/or 106 may be implemented on one computer device or multiple computer devices. Database 118 and/or 116 may include one or more disk drives, solid state memory, volatile and/or non-volatile memory, an array of storage disks, and/or a plurality of redundant storage elements. Severs 102, 104, and/or 106 may include a virtual server distributed and/or copied among multiple hardware server elements.

In operation, a client such as client 108 using a web browser or other client application may initiate an evaluation of the performance of the search engine in server 106 and/or request information regarding the performance of the search engine in server 106. The client 108 may receive an input from a user including a seed string to enable search query generator 126 to generate a list of search queries associated with the seed string. The search query generator may then send the list of search queries to the server 106. The server 106 may then search an index of information within, for example, database 118 for each search query in the list. The server 106 may then generate multiple lists of search results where each list is associated with one of the search queries. The evaluator 128 may then analyze each of the lists of search results to determine how relevant the search results are to each of the search queries. The evaluator 128 may compare each list of search results with an expected list of search results associated with a particular search query. The comparison may include comparing the rank and/or order in which certain search results are arranged and/or determined by the search engine.

Depending on how relevant the search results are for a particular search query, or among a set of search queries, the evaluator 128 may modify and/or configure a search criteria of the search engine in the server 106 to enable the search engine to provide more relevant search results in response to the search queries that were tested. The configuration may include modifying and/or configuring a dictionary of terms, data, and/or metadata associated with a particular search query. The functions and/or applications associated with server 102, 104, and 106, such as search query generator 126 and evaluator 128 may be implemented in one server or a portion of the servers, and/or distributed among the servers 102, 104, and 106.

Figure 2:
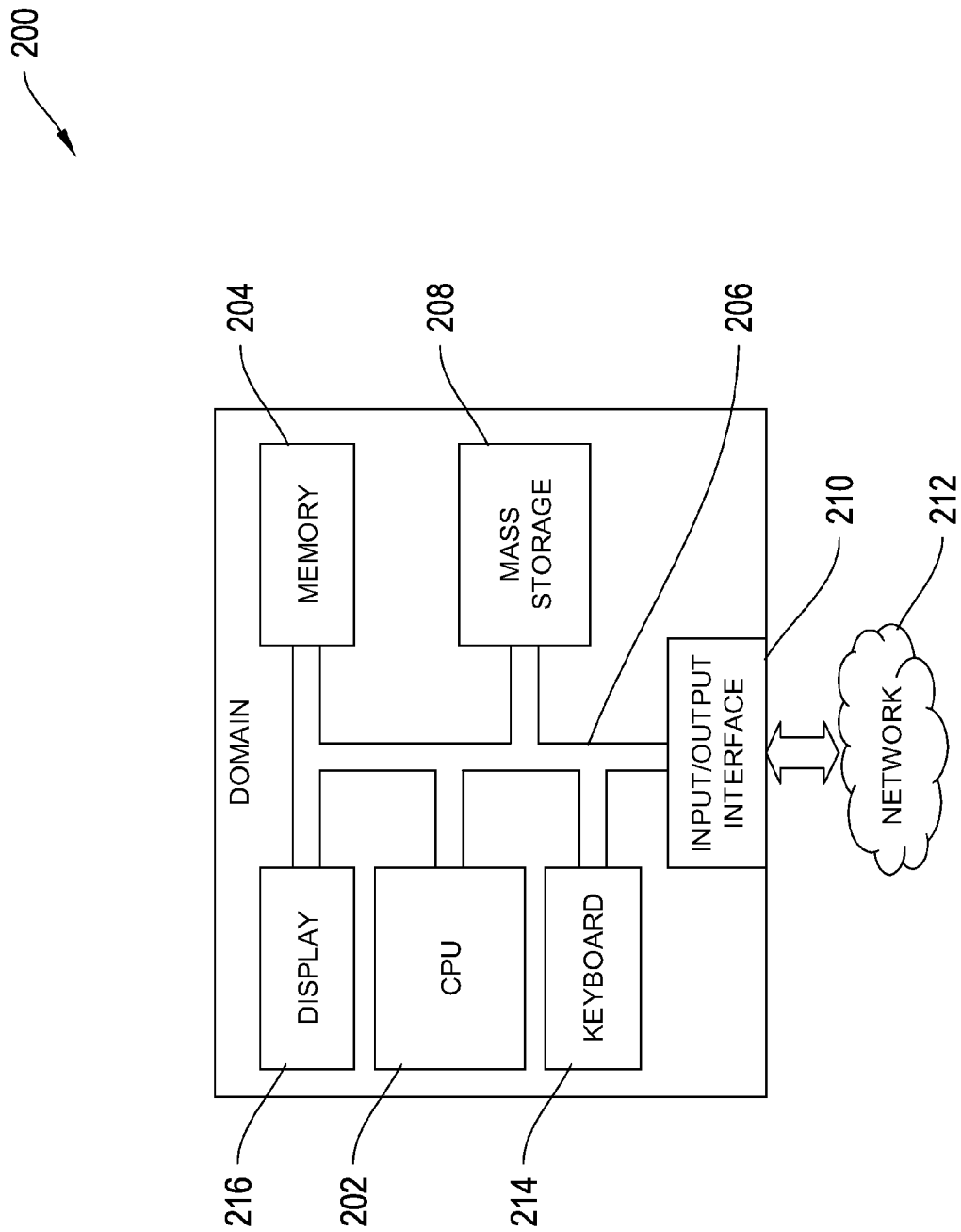
FIG. 2 is a functional diagram of a computer system.

FIG. 2 includes a functional block diagram of a computer system 200, e.g., a computer, for performing the functions of any one of servers 102-106 and/or clients 108-114 of FIG. 1. The exemplary computer system 200 includes a central processing unit (CPU) 202, a memory 204, and an interconnect bus 206. The CPU 202 may include a single microprocessor or a plurality of microprocessors for configuring computer system 200 as a multi-processor system. The memory 204 illustratively includes a main memory and a read only memory. The computer 200 also includes the mass storage device 208 having, for example, various disk drives, tape drives, etc. The main memory 204 also includes dynamic random access memory (DRAM) and high-speed cache memory. In operation, the main memory 204 stores at least portions of instructions and data for execution by the CPU 202.

The mass storage 208 may include one or more magnetic disk or tape drives or optical disk drives or memory sticks, for storing data and instructions for use by the CPU 202. At least one component of the mass storage system 208, preferably in the form of a disk drive or tape drive, stores the database used for processing data, search queries, and/or search results of the system 100. The mass storage system 208 may also include one or more drives for various portable media, such as a floppy disk, a compact disc read only memory (CD-ROM, DVD, CD-RW, and variants), or an integrated circuit non-volatile memory adapter (i.e. PC-MCIA adapter) to input and output data and code to and from the computer system 200.

The computer system 200 may also include one or more input/output interfaces for communications, shown by way of example, as interface 210 for data communications via the network 212 (or network 114). The data interface 210 may be a modem, an Ethernet card or any other suitable data communications device. To provide the functions of a server 102, 104, and/or 106 or client 108, 110, 112, and/or 114 according to FIG. 1, the data interface 210 may provide a relatively high-speed link to a network 221 (or network 120 of FIG. 1), such as an intranet, internet, or the Internet, either directly or through another external interface 210. The communication link to the network 212 may be, for example, optical, wired, or wireless (e.g., via satellite or cellular network). Alternatively, the computer system 200 may include a mainframe or other type of host computer system capable of Web-based communications via the network 212. The computer system 200 may include software for operating a network application such as a web server and/or web client.

The computer system 200 also includes suitable input/output ports, that may interface with a portable data storage device, or use the interconnect bus 206 for interconnection with a local display 216 and keyboard 214 or the like serving as a local user interface for programming and/or data retrieval purposes. The display 216 may include a touch screen capability to enable users to interface with the system 200 by touching portions of the surface of the display 216. Server operations personnel may interact with the system 200 for controlling and/or programming the system from remote terminal devices via the network 212.

The computer system 200 may run a variety of application programs and store associated data in a database of mass storage system 208. One or more such applications may include enabling search engine optimization as described later herein with respect to FIGS. 3-11.

The components contained in the computer system 200 are those typically found in general purpose computer systems used as servers, workstations, personal computers, network terminals, and the like. In fact, these components are intended to represent a broad category of such computer components that are well known in the art.

As discussed above, the computer system 200 may include one or more applications that enhance and/or optimize search engine performance according to aspects of the application. The system 200 may include software and/or hardware that implement a web server application. The web server application may include software such as HTML, XML, WML, SGML, PHP (Hypertext Preprocessor), CGI, and like languages.

The foregoing features of the disclosure may be realized as a software component operating in the system 200 where the system 200 is Unix workstation or other type of workstation. Other operation systems may be employed such as, without limitation, Windows®, MAC OS®, and LINUX. In some aspects, software can optionally be implemented as a C language computer program, or a computer program written in any high level language including, without limitation, C++, Fortran, Java, or Visual BASIC. Certain script-based programs may be employed such as XML, WML, PHP, and so on.

As stated previously, the mass storage 208 may include a database. The database may be any suitable database system, including the commercially available Microsoft Access database, and can be a local or distributed database system. The database can be supported by any suitable persistent data memory, such as a hard disk drive, RAID system, tape drive system, floppy diskette, or any other suitable system. The system 200 may include a database that is integrated with the system 200, however, it will be understood by those of ordinary skill in the art that in other embodiments the database and mass storage 208 can be an external element.

In certain aspects, the system 200 may include an Internet browser program and/or be configured to operate as a web server. In some embodiments, the client and/or web server may be configured to recognize and interpret various network protocols that may be used by a client or server program. Commonly used protocols include Hypertext Transfer Protocol (HTTP), File Transfer Protocol (FTP), Telnet, and Secure Sockets Layer (SSL), for example. However, new protocols and revisions of existing protocols may be frequently introduced. Thus, in order to support a new or revised protocol, a new revision of the server and/or client application may be continuously developed and released.

In one aspect, the system 100 includes a networked-based, e.g., Internet-based, application that may be configured and run on the system 200 and/or any combination of the other components of the system 100. The servers 102, 104, and/or 106 (or system 200) may include a web server running a Web 2.0 application or the like. Web applications running on the servers 102, 104, and/or 106 may use server-side dynamic content generation mechanisms such, without limitation, Java servlets, CGI, PHP, or ASP.

In certain implementations, any one of the servers 102-106 and/or clients 108-114 may include applications that employ asynchronous JavaScript+XML (Ajax) and like technologies that use asynchronous loading and content presentation techniques. These techniques may include, without limitation, XHTML and CSS for style presentation, document object model (DOM) API exposed by a web browser, asynchronous data exchange of XML data, and web browser side scripting, e.g., JavaScript. Certain web-based applications and services may utilize web protocols including, without limitation, the services-orientated access protocol (SOAP) and representational state transfer (REST). REST may utilize HTTP with XML.

Any one of the servers 102-106 and/or clients 108-114 may also provide enhanced security and data encryption. Enhanced security may include access control, biometric authentication, cryptographic authentication, message integrity checking, encryption, digital rights management services, and/or other like security services. The security may include protocols such as IPSEC and IKE. The encryption may include, without limitation, DES, AES, RSA, and any like public key or private key based schemes.

Figure 3:
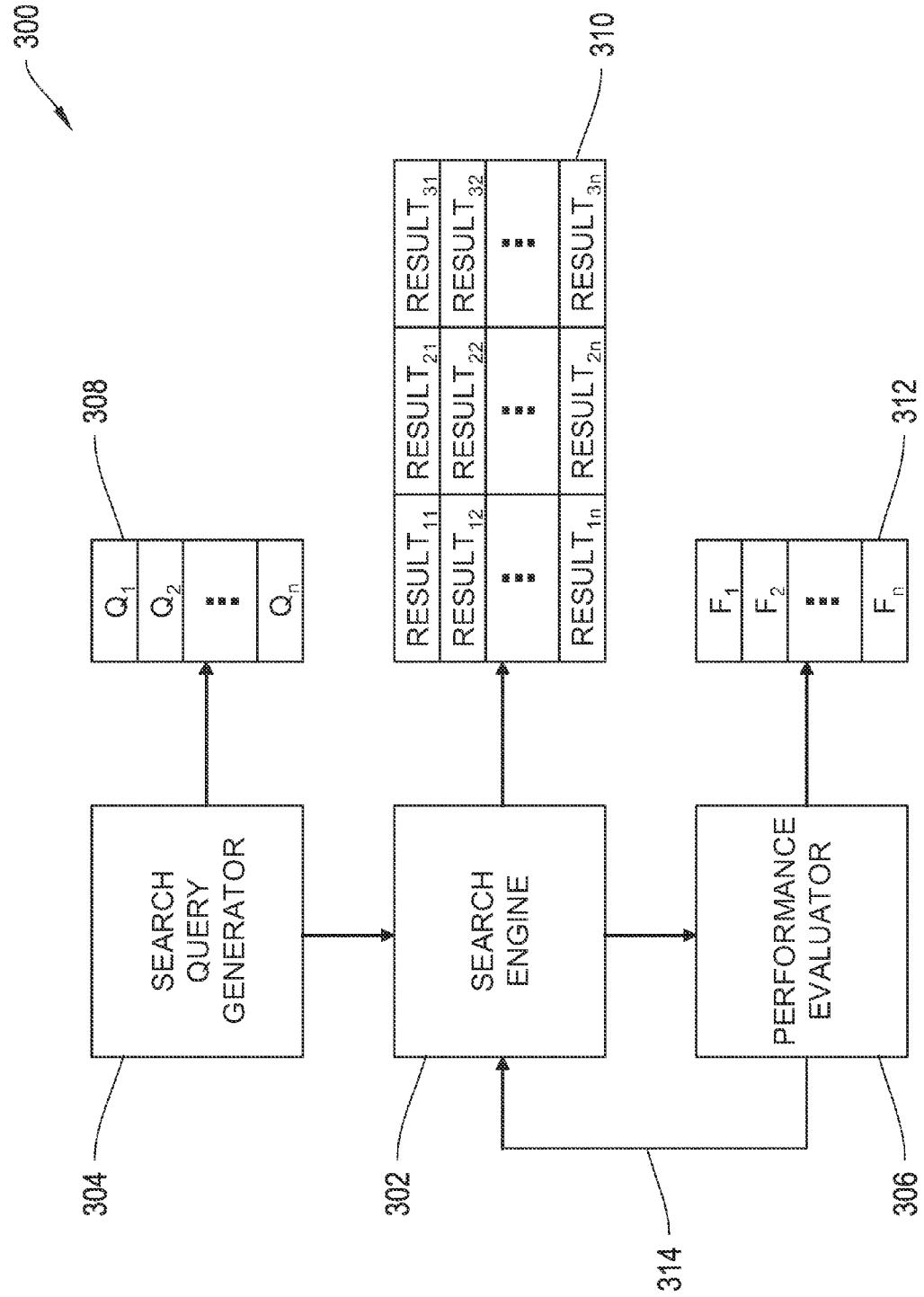
FIG. 3 is a functional diagram of a system for optimizing search engine performance.

FIG. 3 is a functional diagram of a system 300 for optimizing the performance of a search engine 302. In one implementation, the system 300 includes functions, applications and/or units such as a search engine 302, a search query generator 304, and a performance evaluator 306. A function and/or unit may be implemented using software, hardware, or a combination thereof. Each of the functions 302, 304, and 306 may be implemented in the same server such as server 102 of FIG. 1. Alternatively, one or more of the functions 302, 304, and 306 may be implemented in a separate server. For example, the search query generator 304 and performance evaluator 306 may reside in the same server 102, while the search engine 302 resides in server 106. In certain configurations, portions of the functions 302, 304, and 306 may be distributed among multiple servers such as, for example, servers 102, 104, and 106 of FIG. 1.

In operation, the system 300 generates a list 308 of queries an/or a truth matrix from a corpus of queries. The system 300 may utilize one or more techniques to generate the list 308. One such technique may include using a query value assigned to each query in the corpus and a user-defined seed string to generate the list 308 of queries. Further details regarding the generation of the list 308 based on a query value assigned to each query is provided in co-pending U.S. patent application Ser. No. 13/426,087, entitled "Systems and Methods for Generating Search Queries," the entire contents of which are incorporated herein by reference.

Figure 4:
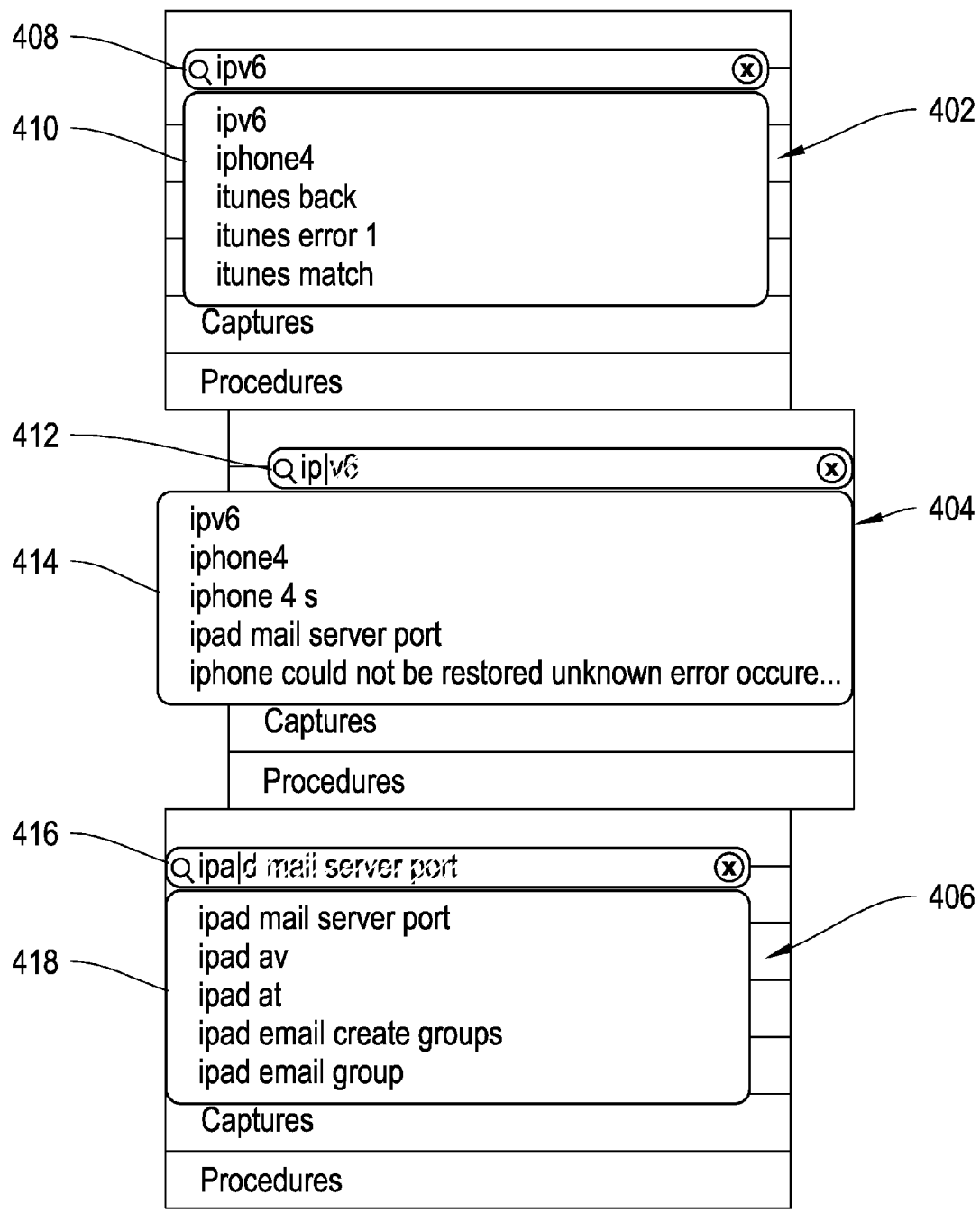
FIG. 4 shows a sequence of screen shots illustrating how a search query generator may generate sets of search queries as a user types each letter of a seed string.

FIG. 4 shows a sequence of screen shots 402, 404, and 406 illustrating how the search query generator 304 may generate sets of search queries as a user types each letter of a seed string. Screen shot 402 displays the query seed string 408 including the letter "I" along with the resulting list 410 of search queries based on query values generated by search query generator 304. Screen shot 404 displays the query seed string 412 for the letters "Ip" along with the resulting list 414 of search queries based on query values generated by search query generator 304. Screen shot 406 displays the query seed string 416 for the letters "Ipa" along with the resulting list 418 of search queries based on query values generated by search query generator 304. Thus, as a user types the letters of a query seed string, the system 300 may dynamically generate a list 308 of search queries to be used to evaluate the performance of search engine 302.

Instead of or in addition to providing a list 308 via a user interface such as illustrated in FIG. 4, the search query generator 304 may generate a list 308 of queries in an application and/or file to enable more efficient processing by any one of the units 302, 304, and 306. For example, the search query generator 304 may provide the list 308 to evaluator 306 via a data file. The data file may include a spreadsheet.

Returning to FIG. 3, the search query generator 304 and/or performance evaluator 306 may then have the search engine 302 execute a search based on each query within the list 308. The search engine 302 may generate a set, matrix, and/or table of search results 310 including search results corresponding to each query in the list 308. For example, for query $Q_1$ of list 308, the search engine 302 may generate a list of results including $Result_{11}$, $Result_{12}$, . . . $Result_{1n}$. For query $Q_2$, search engine 302 may generate a list of results including $Result_{21}$, $Result_{22}$, . . . $Result_{2n}$. For query $Q_3$, search engine 302 may generate a list of results including $Result_{31}$, $Result_{32}$, . . . $Result_{3n}$, and so on until search engine 302 generates the set of results 310 corresponding to the queries of list 308.

FIG. 5 is a display of data within a data file 500 including a list 502 of search queries and corresponding lists 504, 506, and 508 of best search results, good search results, and bad search results respectively. In one implementation, the set of results 310 are arranged in a database and/or data file 500 such that certain search results 310 are categorized based on best search results, good search results, and bad search results. In one configuration, the data file 500 associates each query with information identifying the search results 310 by article name and/or document name. For example, the search query "backup iphone" includes in column B the document identifier "HT1414" representing the best (i.e., most relevant) document and/or webpage returned by the search engine 302. Column C of data file 500 includes the document identifier "ht3603" representing a good (i.e., relevant) document and/or webpage returned by the search engine 302. Column D of data file 500 includes the document identifier "ts2800" representing a bad and/or insufficiently relevant document and/or webpage returned by the search engine 302.

For illustration purposes, a reference database and/or data file may be arranged in a same or similar manner as the data file 500. For a reference file, the lists 504, 506, and 508 may be considered reference lists used by the search query generator 304 to compare with the search results 310 to then determine the relevancy values of list 312 that correspond to the queries of list 308.

Returning to FIG. 3, the performance evaluator 306 may analyze the results 310 by calculating a relevancy score (F) for each query in the list 308. For example, the evaluator 306 may review $Result_{11}$, $Result_{12}$, . . . , and $Result_{1n}$ to determine how relevant the search results provided by the search engine 302 are in relation to the query $Q_1$ of list 308. For each of the queries of list 308, the evaluator 306 may generate a list 312 including the relevancy score F corresponding to each query of list 308 including for example, $F_1$, $F_2$, . . . , and $F_n$. In certain implementations, the relevancy score is based on the precision (P) and recall (R) associated with each query of list 308.

The relevancy score may be based on a heuristic relevancy score derived from a harmonic mean and/or average relevancy score of multiple relevancy scores, where each of the multiple relevancy scores has an associated precision and/or recall value that is weighted differently. The heuristic relevancy score may be used to evaluate the performance of the search engine 302. Furthermore, the heuristic relevancy score may be used to optimize and/or automatically tune the performance of the search engine 302 by enabling the evaluator 306 to provide feedback 314 and/or reconfigure one or more definitions of the search engine 302 to, thereby, generate more relevant and/or desired search results 310.

In one configuration, a relevancy score is determined based on the following formula:

$$F_\beta = \frac{(1 + \beta^2)(\text{precision} * \text{recall})}{(\beta^2 * \text{precision} + \text{recall})} \quad (1)$$

Where:
precision=(# of relevant documents∩retrieved documents)/retrieved documents
recall=(# of relevant documents∩retrieved documents)/relevant documents The Beta value (β) may be a weight factor used to specify a precision value having more significance and/or weight than a recall value or visa versa. For example, if the beta value is less than 1.0 (e.g., 0.5), the precision value will have more weight than the recall value. If the beta value is greater than 1.0 (e.g., 2.0), the recall value will have more weight than the precision value. If the beta value is equal to 1.0, then the precision value and recall value will be weighted equally.

Figure 6:
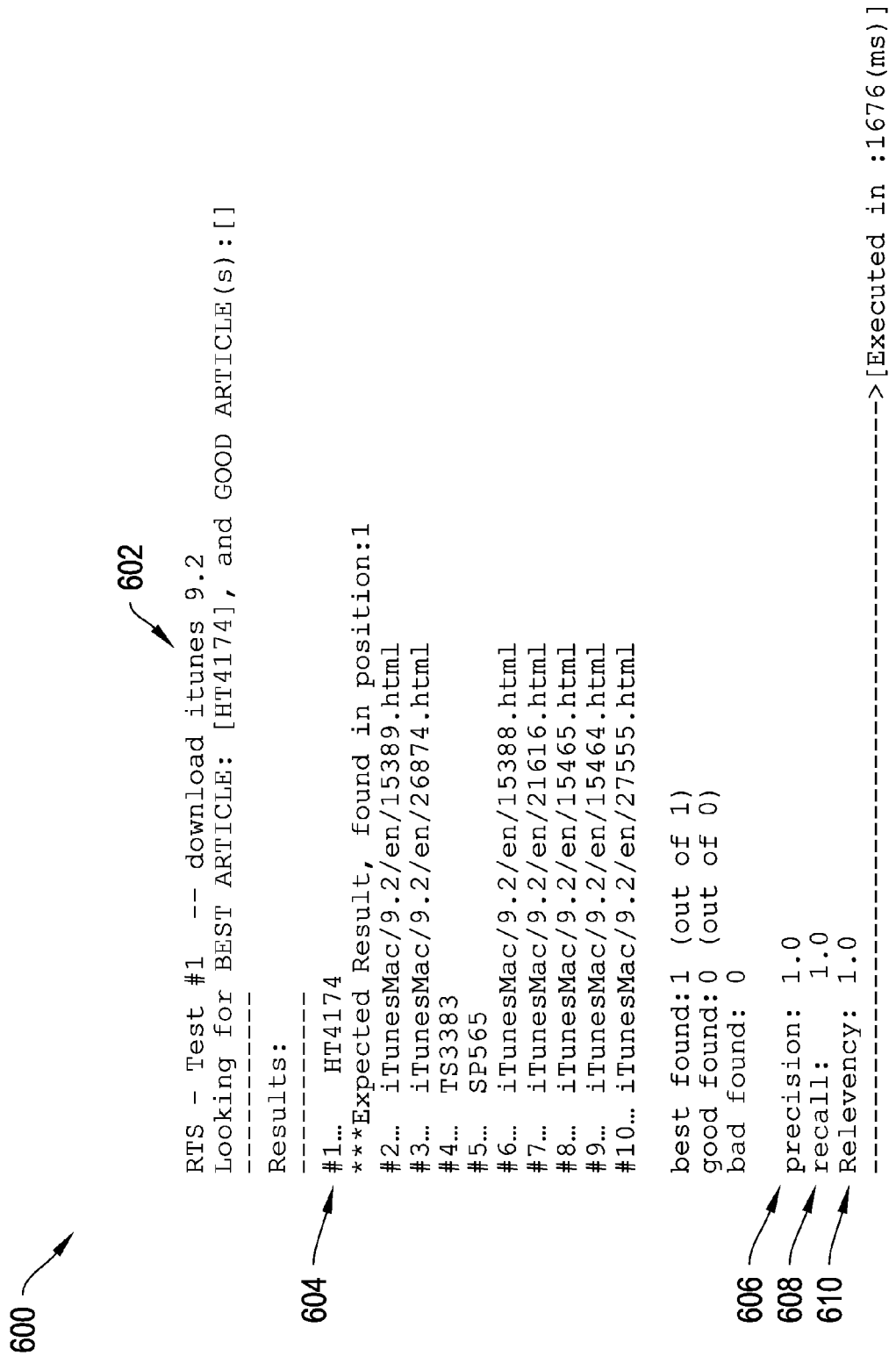
FIG. 6 is a display of the results of a performance evaluation associated with a search query.

FIG. 6 is a display 600 of the test results of a performance evaluation by the evaluator 306 associated with a search query 602 "download itunes 9.2." In this test, the evaluator 306 was looking for an expected best article "HT4174." As shown in the results, the article "HT4174" was ranked as the first result 604 out of ten returned articles. Based on formula (1) above, the precision value 606 was determined to be 1.0 (or 100%). For example, precision=(1∩1)/1=1.0. Also, the recall value 608 was determined to be 1.0. For example, recall=(1∩1)/1=1.0. Therefore, based on formula (1), the relevancy score 610 was determined to be 1.0 (or 100%). For example, assuming beta=1, then $F=((1+1^2)(1*1))/(1^2*1+1) = 2/2 = 1.0$.

FIG. 7 is a display 700 of the test results of performance evaluation by evaluator 306 associated with another search query 702 "home sharing itunes." In this test, the evaluator 306 is looking for article "HT3819" in position 1 as the first result 704 and looking for good articles "ts2972, SP574, and SP573" in positions 2-5. In this test, the evaluator 306 is only considering results ranked in positions 1-5. Thus, even though, article "ts2972" was the sixth result 706, "ts2972" was not considered for the relevancy score because it was not ranked in any one of positions 1-5. Based on formula (1) above, the precision value 708 was determined to be 0.25 (or 25%). Also, the recall value 710 was determined to be 0.25 (or 25%). Therefore, based on formula (1), the relevancy score 712 was determined to be 0.25 (or 25%).

FIG. 8 is a display 800 showing the determination of average precision 802, recall 804, and relevancy 806 for a set of search queries. In certain implementations, the evaluator 306 determines the relevancy performance of the search engine 302 by determining a mean and/or average relevancy value 806 associated with a set of queries. The set of queries may be varied from 1 to millions or even greater. The relevancy value 806 may be determined where the beta value is fixed at a set value. Alternatively, the relevancy value 806 may be determined where the beta value is varied over a range of values. The beta value may include a value in the range of 0.01 to 10.

Figure 9:
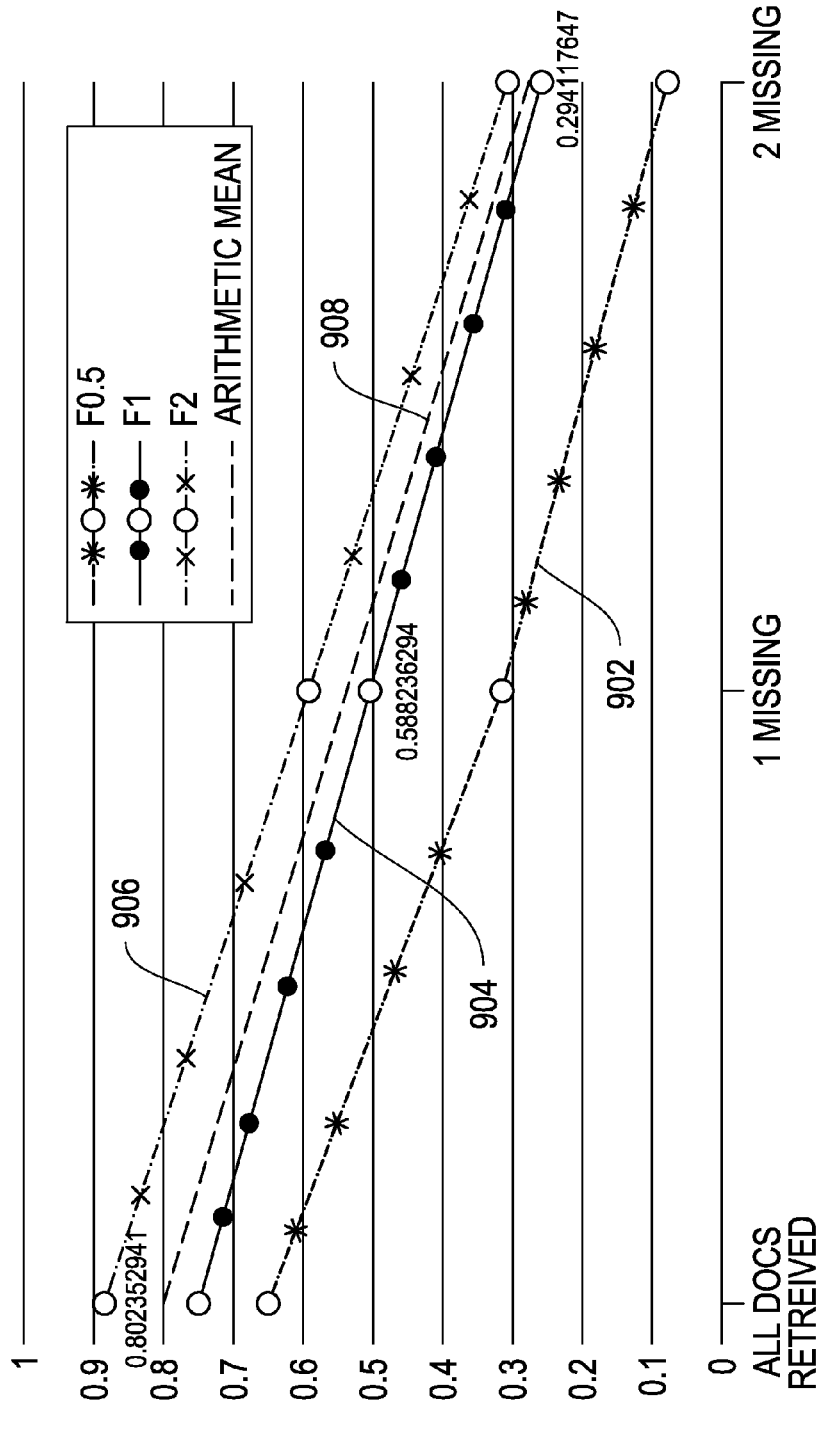
FIG. 9 is a display of a plot including the relevancy value at various Beta weights and mean relevancy value.

FIG. 9 is a display of a plot 900 including the plots 902, 904, and 906 of a relevancy value at various Beta weights and/or values, and a plot 908 of a mean relevancy value. In certain implementations, the evaluator 306 advantageously analyzes the results 310 from the search engine 302 in response to one or more queries and computes one or more relevancy scores at different beta values and/or weights. By computing relevancy at different beta values, the evaluator 306 is able to analyze the performance of the search engine 302 based on emphasizing either precision or recall. The evaluator 306 may determine a mean, harmonic mean, and/or average relevancy value based on one or more relevancy scores using different beta values. In this way, the evaluator 306 may provide a more appropriate and accurate measure of search engine 302 performance.

Table 1 (below) provides a tabular description of the calculation of precision, recall, and relevancy for the plots 902, 904, and 906 of FIG. 9. Additionally, Table 1 shows the calculation of an arithmetic mean plot 908 based on the plots 902, 904, and 906.

TABLE 1

Relevancy Calculation

| | | | |
|---|---|---|---|
| Search Result Limit | 5 | | |
| # Retrieved Documents | 5 | | |
| # Relevant Documents | 3 | 2 | 1 |
| Beta value (β) | 0.5 | 1 | 2 |
| Relevant Docs ∩ Retrieved Docs | 3 | 2 | 1 |
| Precision = (Relevant docs ∩ Retrieved Docs)/ Retrieved Docs | 0.6 | 0.4 | 0.2 |
| Recall = (Relevant Docs ∩ Retrieved Docs)/ Relevant Docs | 1 | 0.66667 | 0.33333 |
| Relevancy | | | |
| F (0.5) | 0.6521739 | 0.3125 | 0.0735294 |
| F (1) | 0.75 | 0.5 | 0.25 |
| F (2) | 0.8823529 | 0.5882353 | 0.2941177 |
| Mean | 0.8 | 0.5333333 | 0.2666667 |

In certain implementations, the evaluator 306 may use an alternative technique to determine the precision value. The evaluator 306 may calculate the precision value as follows:

$$precision = \frac{\sum_{i=1}^{i=n} query\_precision_i}{|\#queries|} \quad (2)$$

$$query\_precision = \frac{\sum_{k=1}^{k=(b+g)} hit\_precision_k}{b+g} \quad (3)$$

$$hit\_precision = \frac{1}{hitPosition - bestAvailPos} \quad (4)$$

Where:
b=# of best hits
g=# of good hits
hitPosition=the position in a list of results returned by the search engine.
bestAvailPos=the highest position in a list of results that is not occupied by an expected result.
queries=number of queries selected for determining precision.

With respect to formulas (2), (3), and (4), the evaluator 306 may calculate and/or determine a precision value based on a set of queries. The set of queries may be related to and/or based on a seed string. The evaluator 306 may set a threshold (T) that is the maximum number of search results that can be evaluated and/or scored. For example, if T=8, then the search results in positions 1-8 of, for example, FIG. 7, will be scored if an expected result is found. For each query of the set of queries, the evaluator 306 may set a number of expected results (E). For example, in FIG. 7, there are four expected resulting articles "HT3819, ts2972, SP574, and SP573." Therefore, E=4. When the evaluator 306 receives the search results 310, the evaluator 306 arranges the found expected results in a list and/or array. The evaluator then removes the found results positions from 1 to T.

For example, if T=8, then for a query Q, if the expected results are found in positions 2, 4, and 6, (e.g., hitPosition) then the available positions remaining (e.g., AvailPos) are now positions 1, 3, 5, 7, and 8. As illustrated by formula (2), the precision value may be determined based on a sum of query precisions associated with a set of queries. Furthermore, each query precision may be based on a position in and/or rank of a returned result (e.g., article), and may be in relation to a best available position in the returned list of results.

Figure 10:
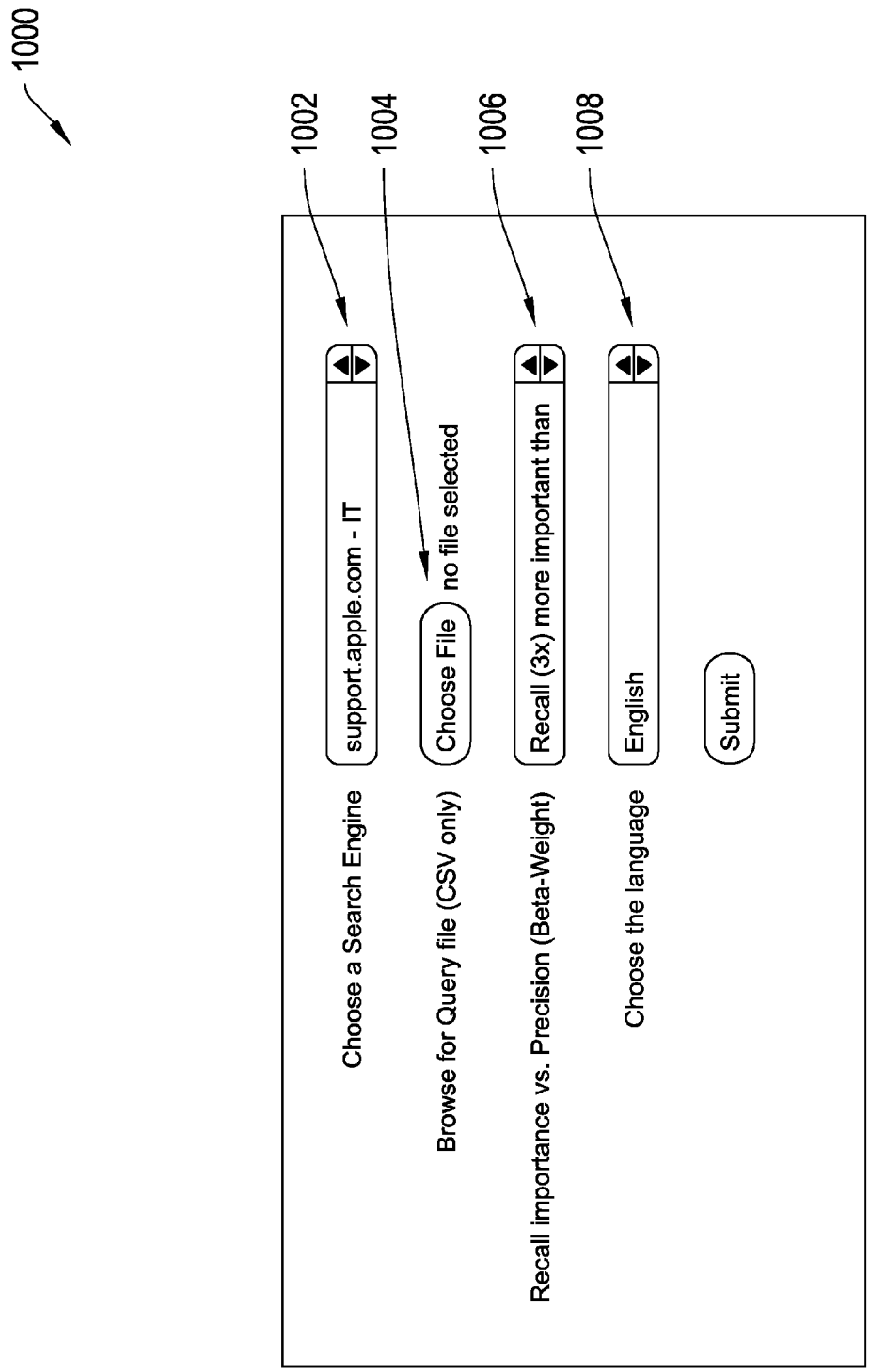
FIG. 10 is a display of a user interface input window that enables a user to configure parameters for evaluating the performance of a search engine.

FIG. 10 is a display of a user interface input window 1000 that enables a user to configure parameters for evaluating the performance of a search engine 302. In certain implementations, the evaluator 306 and/or search query generator 304 may provide a user interface including window 1000 to enable a user to configure an evaluation and/or optimization of search engine 302. Window 1000 includes a search engine selector 1002, query file selector 1004, a beta weight selector 1006, and a language selector 1008.

In one configuration, the evaluator 306 via window 1000 provides a user selection of a target search engine via selector 1002. The search engine may include a commercial search engine and/or an enterprise search engine. Depending on the search engine selected, the evaluator 306 may use different reference data for the evaluation of the search engine. Depending on the domain of a target user, the evaluator may use difference reference data for the evaluation of the search engine. For example, if a target user is a technical support representative assigned to a technical support domain, the evaluator 306 may evaluate the search engine 302 and/or tune the search engine 302 to provide optimal search results tailored to technical support.

In one configuration, the selector 1004 enables a user to select a particular data file (e.g., a CSV file) that includes a set of search queries 308. The window 1000 may include a selector 1006 that enables a user to select the beta weight and/or value in order to emphasize either precision or recall. The window 1000 may include a selector 1008 to enable to a user to specify a language (e.g., English) to be used by the evaluator 306 and/or query generator 304.

Figure 11:
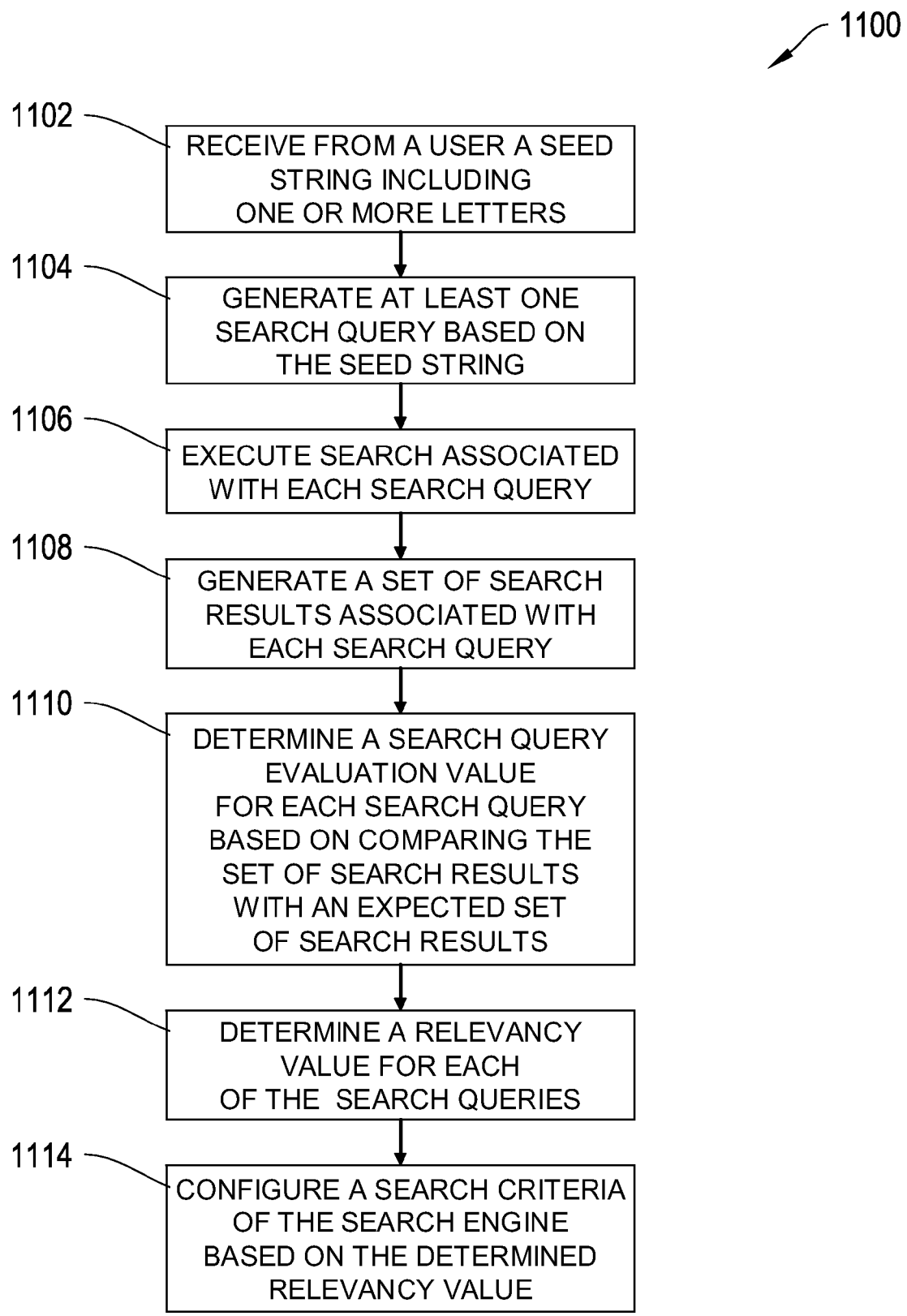
FIG. 11 is a flow diagram of a process for optimizing the performance of a search engine.

FIG. 11 is a flow diagram of a process 1100 for optimizing the performance of a search engine 302. First, the search query generator 304 receives from a user via a user interface a seed string including one or more letters (Step 1102). The search query generator 304 generates one or more search queries 308 based on the seed string (Step 1104). The search query generator 304 may provide the search queries 308 via a file to the search engine 302 or may provide the search queries 308 to the evaluator 306. The evaluator 306 may then submit each query individually or in bulk to the search engine 302. The search engine 302 may then execute a search associated with each of the search queries 308, where each of the search queries 308 includes an example, suggestion, and/or term (Step 1106). An example, suggestion, and/or term may include a word, name, portion of a word, and/or identifier of a topic or subject of interest.

The search engine 302 then generates a set of search results 310 associated with each of the search queries 308 (Step 1108). The evaluator 306 may then determine a search query evaluation value (e.g., a precision value and/or recall value) for each of the search queries 308 based at least in part on comparing the set of search results 310 associated with each of the search queries 308 with an expected set of search results (Step 1110).

The evaluator 306 then determines one or more relevancy values 312 for each of the search queries 308, where each of the relevancy values 312 is based on the search evaluation values associated with the search queries 308 (Step 1112). Then, the evaluator, via feedback 314, configures a search criteria of the search engine 302 based on the one or more determined relevancy values 312 (Step 1114). As part of configuring the search criteria, the system 300 may update a dictionary associated with the search engine 302. The system 300 may also repeat one or more of the functions and/or steps until the relevancy value associated with at least one search query is greater than or equal to a relevancy threshold value set by the system and/or user.

It will be apparent to those of ordinary skill in the art that the systems and methods involved in the present application may be embodied in a computer program product that includes a computer usable, non-transitory, and/or readable medium. For example, such a computer usable medium may consist of a read only memory device, such as a CD ROM disk or conventional ROM devices, or a random access memory, such as a hard drive device or a computer diskette, or flash memory device having a computer readable program code stored thereon.

It is understood that the various features, elements, or processes of the foregoing figures and description are interchangeable or combinable to realize or practice the implementations describe herein. Those skilled in the art will appreciate that aspects of the application can be practiced by other than the described implementations, which are presented for purposes of illustration rather than of limitation, and the aspects are limited only by the claims which follow.

What is claimed is:

1. A method of optimizing search engine performance comprising:
   receiving from a user a seed string including one or more letters;
   generating at least one search query based on the seed string;
   executing a search associated with each of the at least one search query, the search query including at least one of an example, suggestion, or a term;
   generating a set of search results based on the executed search;
   retrieving, from a data source different than a data source used by the search, a previously stored set of expected results associated with the search query, wherein the previously stored set of expected results is distinct from the set of search results generated in response to receiving the seed string, and wherein the expected results have a predetermined degree of relevance to the search query;
   determining a search query evaluation value for each of the at least one search query based at least in part on comparing the set of search results associated with each of the at least one search query with the previously stored set of expected results, wherein the search query evaluation value includes one or more of a precision value or a recall value;
   determining a mean relevancy value for each of the at least one search query, wherein the mean relevancy value is based on a plurality of relevancy values calculated based on different weighting of the search query evaluation value associated with the at least one search query; and
   configuring a search criteria of the search engine based on the mean relevancy value, the configured search criteria for use in a subsequent search after the set of search results have been generated.

2. The method of claim 1, wherein at least one search query evaluation value is determined subsequent to the search.

3. The method of claim 1, wherein at least one search query evaluation value is determined in real-time during the search.

4. The method of claim 1, wherein the search query evaluation value includes the precision value determined based on a sum of query precisions associated with a set of queries related to the seed string.

5. The method of claim 4 comprising weighting at least one of the precision value and the recall value, determined based on the number of documents in a set of documents defined by an intersection of a set of relevant documents and a set of retrieved documents, divided by the number of documents in the set of relevant documents.

6. The method of claim 5, wherein each of the plurality of relevancy values is calculated based on different weighting of the precision value and the recall value.

7. The method of claim 1 comprising generating the at least one search query based on an assigned query value.

8. The method of claim 1 comprising determining the relevancy values for each of the at least one search query based on a domain associated with a searcher using the seed string.

9. The method of claim 1, wherein configuring the search criteria includes updating a dictionary of terms associated with the search engine.

10. The method of claim 8 comprising repeatedly evaluating each of the at least one search query until the mean relevancy value associated with at least one search query is greater than or equal to a relevancy threshold value.

11. A non-transitory computer readable medium storing instructions, which when executed by one or more processors of a data processing system causes the data processing system to perform a method of optimizing search engine performance comprising:
    receiving from a user a seed string including one or more letters;
    generating at least one search query based on the seed string, the search query including at least one of an example, suggestion, or a term;
    sending, to the search engine, the at least one search query for execution of a search associated with each of the at least one search query;
    receiving, from the search engine, a set of search results associated with each of the at least one search query;
    retrieving, from a data source different than a data source used by the search, a previously stored set of expected results associated with the search query, wherein the previously stored set of expected results is distinct from the set of search results generated in response to receiving the seed string, and wherein the expected results have a predetermined degree of relevance to the search query;
    determining a search query evaluation value for each of the at least one search query based at least in part on comparing the set of search results associated with each of the at least one search query with the previously stored set of expected results, wherein the search query evaluation value includes one or more of a precision value or a recall value;
    determining a mean relevancy value for each of the at least one search query, wherein the mean relevancy value is based on a plurality of relevancy values calculated based on different weighting of the search query evaluation value associated with the at least one search query; and
    configuring a search criteria of the search engine based on the mean relevancy value, the configured search criteria for use in a subsequent search after the set of search results have been generated.

12. The medium of claim 11, wherein at least one search query evaluation value is determined subsequent to the search.

13. The medium of claim 11, wherein at least one search query evaluation value is determined in real-time during the search.

14. The medium of claim 11, wherein the search query evaluation value includes the precision value determined based on a sum of query precisions associated with a set of queries related to the seed string.

15. The medium of claim 14, wherein the data processing system weights at least one of the precision value and the recall value determined based on the number of documents in a set of documents defined by an intersection of a set of relevant documents and a set of retrieved documents, divided by the number of documents in the set of relevant documents.

16. The medium of claim 15, wherein each of the plurality of relevancy values is calculated based on different weighting of the precision value and the recall value.

17. The medium of claim 11, wherein the data processing system generates the at least one search query based on an assigned query value.

18. The medium of claim 11, wherein the data processing system determines the relevancy values for each of the at least one search query based on a domain associated with a searcher using the seed string.

19. The medium of claim 11, wherein configuring the search criteria includes updating a dictionary associated with the search engine.

20. The medium of claim 19, wherein the data processing system repeatedly evaluates generated search queries until the relevancy value associated with at least one search query is greater than or equal to a relevancy threshold value.

21. A system for optimizing search engine performance comprising:
    a processing system having one or more processing units and a memory;
    coupled to the processing system, a search query generator arranged to:
        receive from a user a seed string including one or more letters,
        generate at least one search query based on the seed string, the search query including at least one of an example, suggestion, or a term, and
        send, to the search engine, the at least one search query for execution of a search associated with each of the at least one search query; and
    coupled to the processing system, an evaluator arranged to:
        receive, from the search engine, a set of search results associated with each of the at least one search query,
        retrieve, from a data source different than a data source used by the search, a previously stored set of expected results associated with the search query, wherein the previously stored set of expected results is distinct from the set of search results generated in response to receiving the seed string, and wherein the expected results have a predetermined degree of relevance to the search query,
        determine a search query evaluation value for each of the at least one search query based at least in part on comparing the set of search results associated with each of the at least one search query with the previously stored set of expected results, wherein the search query evaluation value includes one or more of a precision value or a recall value,
        determine a mean relevancy value for each of the at least one search query, wherein the mean relevancy value is based on a plurality of relevancy values calculated based on different weighting of the search query evaluation value associated with the at least one search query, and configure a search criteria of the search engine based on the mean relevancy value, the configured search criteria for use in a subsequent search after the set of search results have been generated.

22. The system of claim 21, wherein at least one of the search query generator and evaluator reside in the same location as the search engine.

23. The method of claim 1, wherein the data source used to retrieve the stored set of expected results is a data file not accessed by the search, wherein the data file includes the at least one search query and a corresponding set of results expected to be returned by the search.

24. The method of claim 23, wherein the corresponding set of results includes one or more categories of expected results, wherein the one or more categories includes a best search result category.

25. The method of claim 24, wherein the one or more categories includes a not relevant search result category.

* * * * *